T. KERSHAW.
Carding-Machine.
No. 220,905. Patented Oct. 21, 1879.
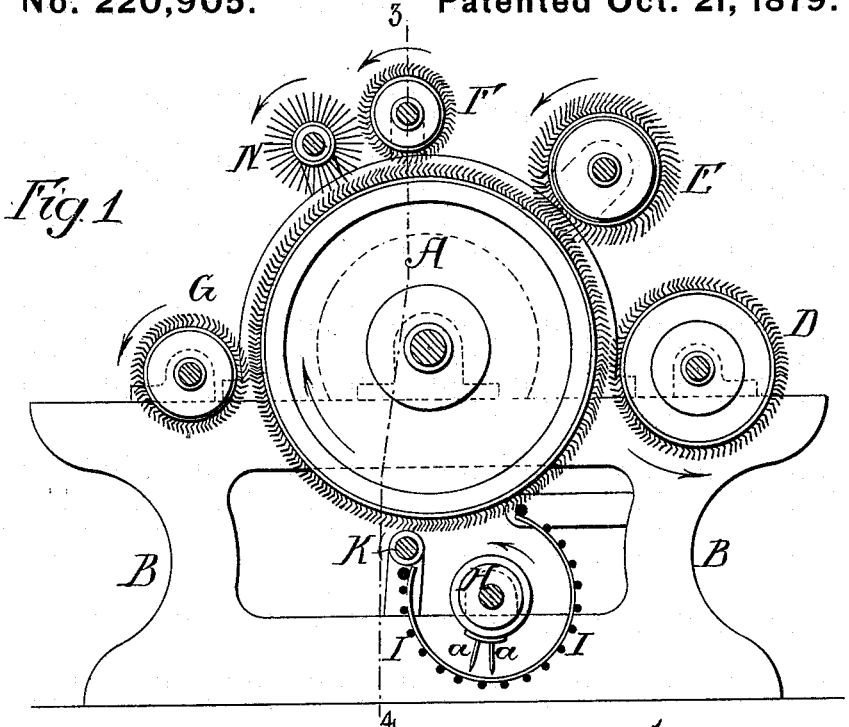
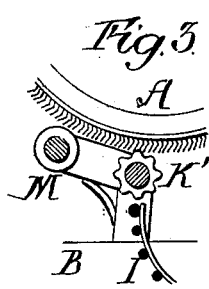
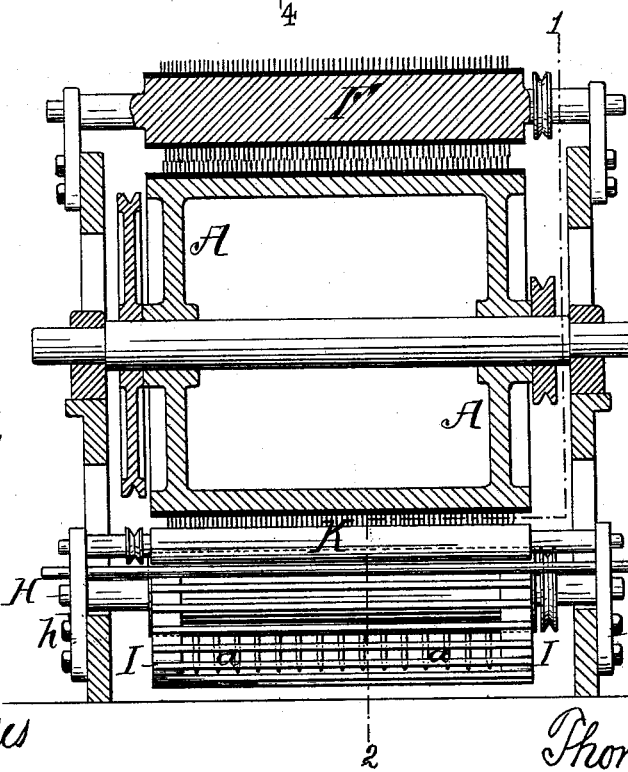
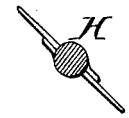
Witnesses
P. McDermer.
Harry Smith
Inventor
Thomas Kershaw
by his Attorneys
Howson and Son

UNITED STATES PATENT OFFICE.

THOMAS KERSHAW, OF PHILADELPHIA, PA., ASSIGNOR OF TWO-THIRDS OF HIS RIGHT TO THOMAS CUNNINGHAM, HORATIO B. LINCOLN, LUCIAN BROWN, GEORGE BROWN, FRANK P. PENDLETON, AND HERMAN E. CUNNINGHAM, OF SAME PLACE.

IMPROVEMENT IN CARDING-MACHINES.

Specification forming part of Letters Patent No. 220,905, dated October 21, 1879; application filed June 16, 1879.

*To all whom it may concern:*

Be it known that I, THOMAS KERSHAW, of Philadelphia, Pennsylvania, have invented a new and useful Improvement in Carding-Machines, of which the following is a specification.

The principal object of my invention is to maintain the main cylinder of a carding-engine in a clean condition, without injury to the teeth of the card-clothing, by combining therewith a rotating shaft armed with straight, radial, pointed teeth, which act intermittingly on the card-clothing, as explained hereinafter.

Another object of my invention is to separate the fibers removed from the carding-cylinder by the said cleaning-teeth from foreign matter, and to restore the fibers to the card-cylinder, by combining a screen and roller with the cleaning-teeth, in the manner described hereinafter.

In the accompanying drawings, Figure 1 is a vertical section, on the line 1 2 of Fig. 2, of a carding-engine with my improvements; Fig. 2, a transverse vertical section on the line 3 4 of Fig. 1; and Figs. 3 and 4 are modifications of parts of my invention.

A is the main card-cylinder of a carding-engine. D is the doffer; E, the fancy card-cylinder; F, one of the worker-rolls, and G the licker-in, all being caused to revolve, in the direction of the arrows, in suitable bearings in the frame B B. Below the main cylinder a shaft, H, is caused to revolve in the direction of the arrow, and this shaft carries a series of cleaning-teeth, *a*—two rows in the present instance—the teeth projecting radially from the shaft, and being straight and pointed, so as not to retain the fibers struck from the clothing of the main cylinder.

The teeth *a* move faster than the circumference of the main card-cylinder, and are arranged to penetrate between the teeth of the card-clothing, preferably to the extent of about two-thirds of the length of the card-teeth.

As the main card-cylinder revolves in the direction of the arrow, the teeth of the shaft H make rapid intermittent movements through the teeth of the card-clothing, and strike therefrom the dirt or refuse matter and much of the fiber which has not been removed by the doffer.

The card-clothing of the main cylinder is thus cleaned at intervals; but care is taken to so regulate the speed of the cleaning-teeth in respect to the speed of the main cylinder that the said cleaning-teeth shall not act on the same portions of the card-clothing at every revolution. In other words, the speed of the main card-cylinder and that of the teeth are so regulated that the teeth have always uncleaned portions of the card-clothing to act upon, the clothing being thus maintained in a sufficiently clean condition without any serious absorption of the power required for driving the carding-engine, owing to the fact that the power required for cleansing purposes is only exerted at intervals.

The intermittingly-acting cleaning-teeth possess the further advantage over the continuously-acting cleaning-rollers heretofore used, of not wearing out the teeth of the card-clothing so rapidly as the rollers.

The shaft H and its cleaning-teeth are contained within a screen, I, secured to the frame, the screen being composed of a grating or metal net-work, having openings or meshes of such a size that the dirt struck from the clothing of the main cylinder can pass freely through them, while the released fiber, influenced by the current of air caused by the revolving cylinders, has a tendency to fly in the direction of the arrow, and is pressed into the card-teeth by the roller K, which is caused to revolve in the direction of the arrow.

In carding wool containing much foreign matter, such as burrs, to which the fiber adheres closely, or in carding cotton in which particles of cotton-seed prevail, I prefer to use a fluted roller, K', Fig. 3, in place of the roller K, Fig. 1, for the following reasons:

While much of the foreign matter is struck from the card-clothing of the main cylinder by the cleaning-teeth, and falls through the grating, particles adhere to the fiber and pass with the same toward the fluted roller K', the grooves of which will afford a lodgment for the seed, burrs, &c., while the fibers adhere to the card-teeth of the main cylinder, and after passing between the fluted roller and card-cylinder, the refuse matter which has been thus separated from the fiber will fall to the floor, while the fibers will continue to adhere to the teeth of the said card-cylinder, to which they may be more closely applied by a second roller, M.

This arrangement has the effect of separating from the fiber such particles as may continue to adhere to it after the action of the revolving teeth.

Prior to my invention continuously-acting card-rolls had been used to remove strippings from the main cylinder of a carding-engine; but the teeth of these stripping-cylinders were not permitted to penetrate between those of the main cylinder, whereas the straight teeth *a a*, described above, strike deep enough between the teeth of the main cylinder to remove therefrom the fiber and dirt with which they have become clogged.

I claim as my invention—

1. The combination, in a carding-engine, of a carding-cylinder with a shaft, H, which is provided with rows of straight, pointed, and radial teeth, and which is arranged in respect to the said cylinder as set forth, whereby when the shaft H is revolved the said teeth shall intermittently act upon and penetrate between the teeth of the card-clothing of the said cylinder, substantially as described.

2. The combination of the card-cylinder, the shaft H, having straight, pointed, radial teeth arranged in respect to the teeth of the card-clothing, as set forth, with the screen I and roller K, as set forth.

In testimony whereof I have signed my name to this specification in the presence of two subscribing witnesses.

THOMAS KERSHAW.

Witnesses:
  WILLIAM J. COOPER,
  HARRY SMITH.